US010983591B1

(12) United States Patent
Ouderkirk et al.

(10) Patent No.: US 10,983,591 B1
(45) Date of Patent: Apr. 20, 2021

(54) EYE RANK

(71) Applicant: Facebook Technologies, LLC, Menlo Park, CA (US)

(72) Inventors: Andrew John Ouderkirk, Redmond, WA (US); Neeraj Choubey, Belmont, CA (US); Andre Golard, Seattle, WA (US); Bo Asp Andersen, Seattle, WA (US); Immo Andreas Schuetz, Redmond, WA (US); Karol Constantine Hatzilias, Kenmore, WA (US); Kelly Ingham, Redmond, WA (US); Martin Henrik Tall, Redwood City, CA (US); Sharvil Shailesh Talati, Mercer Island, WA (US); Robert Dale Cavin, Seattle, WA (US); Thomas Scott Murdison, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 89 days.

(21) Appl. No.: 16/284,413

(22) Filed: Feb. 25, 2019

(51) Int. Cl.
*G06F 3/01* (2006.01)
*G02B 27/00* (2006.01)
*G02B 27/01* (2006.01)
*H04N 13/383* (2018.01)

(52) U.S. Cl.
CPC ......... *G06F 3/013* (2013.01); *G02B 27/0093* (2013.01); *G02B 27/017* (2013.01); *G02B 27/0179* (2013.01); *G02B 2027/0138* (2013.01); *G02B 2027/0178* (2013.01); *G06F 3/012* (2013.01); *H04N 13/383* (2018.05)

(58) Field of Classification Search
CPC ....... G06F 3/013; G06F 3/012; G02B 27/017; G02B 27/0093; G02B 2027/0178; G02B 2027/0138; G02B 27/0179; H04N 13/383
See application file for complete search history.

(56) References Cited

U.S. PATENT DOCUMENTS

| 2014/0344012 | A1* | 11/2014 | Kamhi ................... G06F 3/013 705/7.29 |
| 2015/0113454 | A1* | 4/2015 | McLaughlin ........... G06F 3/013 715/765 |
| 2015/0302585 | A1* | 10/2015 | VanBlon ............... G06F 3/0304 345/173 |
| 2018/0365533 | A1* | 12/2018 | Sathyanarayana ... G06K 9/6267 |
| 2019/0091565 | A1* | 3/2019 | Nelson .................... G07F 17/32 |
| 2019/0113969 | A1* | 4/2019 | Borge ................. G06F 3/04842 |
| 2019/0266696 | A1* | 8/2019 | Wahrenberg ............. G06T 1/60 |
| 2019/0317594 | A1* | 10/2019 | Stent ..................... G05D 1/0221 |
| 2019/0339770 | A1* | 11/2019 | Kurlethimar ........... G06F 3/016 |
| 2020/0034993 | A1* | 1/2020 | Croxford ................ G06F 3/013 |

* cited by examiner

*Primary Examiner* — Christopher M Brandt
(74) *Attorney, Agent, or Firm* — FisherBroyles, LLP

(57) ABSTRACT

The disclosed computer-implemented method may include identifying a region within a user's eye gaze and calculating a ranking for the identified region within the user's eye gaze. The ranking may indicate the user's level of interest in the identified region. The method may then determine how the identified region is to be presented according to the calculated ranking and present the identified region in the determined manner according to the calculated ranking. Various other methods, systems, and computer-readable media are also disclosed.

20 Claims, 8 Drawing Sheets

EYE RANK

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
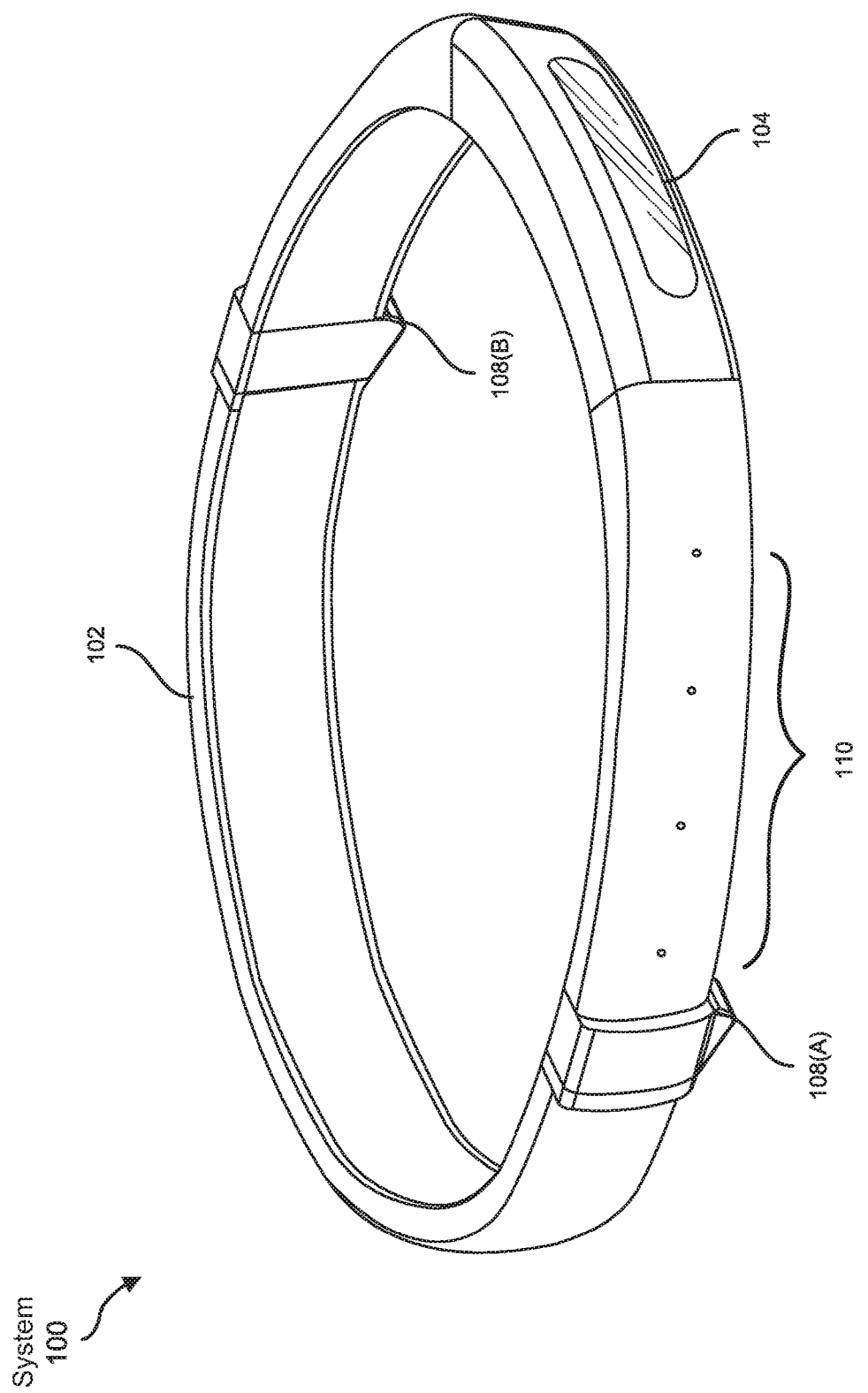
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to presenting information according to a determined eye ranking. As will be explained in greater detail below, embodiments of the instant disclosure may include tracking a user's eye gaze as the user views different objects or different areas within an environment. In at least some of the embodiments described herein, users may be wearing artificial reality devices including virtual reality devices, augmented reality devices, or other electronic devices. These artificial reality devices may be configured to present an electronic representation of some or all of the items or areas the user looks at. For example, an artificial reality device worn by a user may include various external-facing cameras. As the user looks around, these cameras may present a live stream of the items or areas the user looks at. Alternatively, the cameras may record portions of the items or areas the user looks at.

Some traditional artificial reality devices may be configured to present video of items or areas at which the user is looking. The videos streamed or captured by these devices may be streamed when manually turned on by the user or may be turned on at specified intervals. The video data generated by these cameras is typically presented in a conventional pixel format (e.g., 1920×1080) or other similar format. The videos may be compressed prior to transmission and/or storage in such systems but are typically compressed using a compression algorithm that is applied equally to the entire video file. Similarly, when presented to a user on a display, for example, the video is typically shown in full fidelity across the entire display.

In contrast, the embodiments herein may be configured to compress, store, and present data associated with a given region based on a calculated eye ranking. For example, the systems herein may identify a region within a user's eye gaze and calculate a ranking for that region. The ranking may indicate the user's level of interest in the region (or object). The system may then determine how the region is to be presented based on the ranking and then present the region in the determined manner according to the ranking. Part of presenting the data (or prior to presenting the data), any video data captured showing the identified region may be compressed in different ways depending on where the user was looking and for how long. Similarly, the captured video data may be compressed in different manners based on where the user was looking and for how long. These embodiments will be explained in greater detail below with regard to FIGS. 1-10. Initially, FIGS. 1-3 will be described which present different artificial reality device embodiments which may be implemented herein. FIGS. 4-10 will then be described detailing how information may be presented according to a determined eye ranking.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 100 in FIG. 1. Other artificial reality systems may include a NED that also provides visibility into the real world (e.g., augmented-reality system 200 in FIG. 2) or that visually immerses a user in an artificial reality (e.g., virtual-reality system 300 in FIG. 3). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 1, augmented-reality system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. Augmented-reality system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, augmented-reality system 100 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 100 may not include a NED, augmented-reality system 100 may include other types of screens or visual feedback devices (e.g., a display screen integrated into a side of frame 102).

Figure 2:
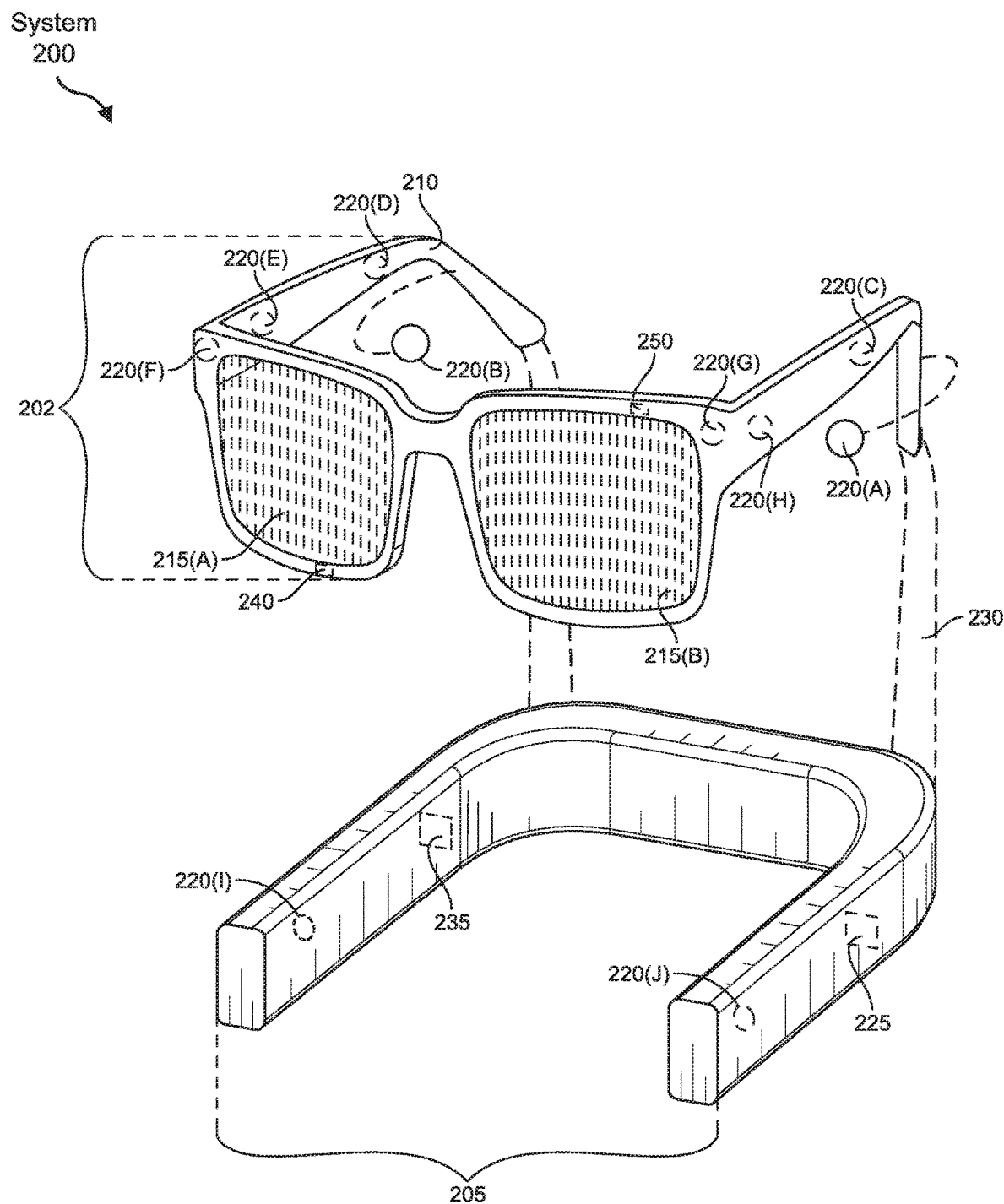
FIG. 2 illustrates an embodiment of an augmented reality headset and corresponding neckband.

The embodiments discussed in this disclosure may also be implemented in augmented-reality systems that include one or more NEDs. For example, as shown in FIG. 2, augmented-reality system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While augmented-reality system 200 includes two displays, embodiments of this disclosure may be implemented in augmented-reality systems with a single NED or more than two NEDs.

In some embodiments, augmented-reality system 200 may include one or more sensors, such as sensor 240. Sensor 240 may generate measurement signals in response to motion of augmented-reality system 200 and may be located on substantially any portion of frame 210. Sensor 240 may represent a position sensor, an inertial measurement unit (IMU), a depth camera assembly, or any combination thereof. In some embodiments, augmented-reality system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

Augmented-reality system 200 may also include a microphone array with a plurality of acoustic transducers 220(A)-220(J), referred to collectively as acoustic transducers 220. Acoustic transducers 220 may be transducers that detect air pressure variations induced by sound waves. Each acoustic transducer 220 may be configured to detect sound and convert the detected sound into an electronic format (e.g., an analog or digital format). The microphone array in FIG. 2 may include, for example, ten acoustic transducers: 220(A) and 220(B), which may be designed to be placed inside a corresponding ear of the user, acoustic transducers 220(C), 220(D), 220(E), 220(F), 220(G), and 220(H), which may be positioned at various locations on frame 210, and/or acoustic transducers 220(I) and 220(J), which may be positioned on a corresponding neckband 205.

In some embodiments, one or more of acoustic transducers 220(A)-(F) may be used as output transducers (e.g., speakers). For example, acoustic transducers 220(A) and/or 220(B) may be earbuds or any other suitable type of headphone or speaker.

The configuration of acoustic transducers 220 of the microphone array may vary. While augmented-reality system 200 is shown in FIG. 2 as having ten acoustic transducers 220, the number of acoustic transducers 220 may be greater or less than ten. In some embodiments, using higher numbers of acoustic transducers 220 may increase the amount of audio information collected and/or the sensitivity and accuracy of the audio information. In contrast, using a lower number of acoustic transducers 220 may decrease the computing power required by the controller 250 to process the collected audio information. In addition, the position of each acoustic transducer 220 of the microphone array may vary. For example, the position of an acoustic transducer 220 may include a defined position on the user, a defined coordinate on frame 210, an orientation associated with each acoustic transducer, or some combination thereof.

Acoustic transducers 220(A) and 220(B) may be positioned on different parts of the user's ear, such as behind the pinna or within the auricle or fossa. Or, there may be additional acoustic transducers on or surrounding the ear in addition to acoustic transducers 220 inside the ear canal. Having an acoustic transducer positioned next to an ear canal of a user may enable the microphone array to collect information on how sounds arrive at the ear canal. By positioning at least two of acoustic transducers 220 on either side of a user's head (e.g., as binaural microphones), augmented-reality device 200 may simulate binaural hearing and capture a 3D stereo sound field around about a user's head. In some embodiments, acoustic transducers 220(A) and 220(B) may be connected to augmented-reality system 200 via a wired connection 230, and in other embodiments, acoustic transducers 220(A) and 220(B) may be connected to augmented-reality system 200 via a wireless connection (e.g., a Bluetooth connection). In still other embodiments, acoustic transducers 220(A) and 220(B) may not be used at all in conjunction with augmented-reality system 200.

Acoustic transducers 220 on frame 210 may be positioned along the length of the temples, across the bridge, above or below display devices 215(A) and 215(B), or some combination thereof. Acoustic transducers 220 may be oriented such that the microphone array is able to detect sounds in a wide range of directions surrounding the user wearing the augmented-reality system 200. In some embodiments, an optimization process may be performed during manufacturing of augmented-reality system 200 to determine relative positioning of each acoustic transducer 220 in the microphone array.

In some examples, augmented-reality system 200 may include or be connected to an external device (e.g., a paired device), such as neckband 205. Neckband 205 generally represents any type or form of paired device. Thus, the following discussion of neckband 205 may also apply to various other paired devices, such as charging cases, smart watches, smart phones, wrist bands, other wearable devices, hand-held controllers, tablet computers, laptop computers and other external compute devices, etc.

As shown, neckband 205 may be coupled to eyewear device 202 via one or more connectors. The connectors may be wired or wireless and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof.

Pairing external devices, such as neckband 205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 205 may be communicatively coupled with eyewear device 202 and/or to other devices. These other devices may provide certain functions (e.g., tracking, localizing, depth mapping, processing, storage, etc.) to augmented-reality system 200. In the embodiment of FIG. 2, neckband 205 may include two acoustic transducers (e.g., 220(I) and 220(J)) that are part of the microphone array (or potentially form their own microphone subarray). Neckband 205 may also include a controller 225 and a power source 235.

Acoustic transducers 220(I) and 220(J) of neckband 205 may be configured to detect sound and convert the detected sound into an electronic format (analog or digital). In the embodiment of FIG. 2, acoustic transducers 220(I) and 220(J) may be positioned on neckband 205, thereby increasing the distance between the neckband acoustic transducers 220(I) and 220(J) and other acoustic transducers 220 positioned on eyewear device 202. In some cases, increasing the distance between acoustic transducers 220 of the microphone array may improve the accuracy of beamforming performed via the microphone array. For example, if a sound is detected by acoustic transducers 220(C) and 220(D) and the distance between acoustic transducers 220(C) and 220 (D) is greater than, e.g., the distance between acoustic transducers 220(D) and 220(E), the determined source location of the detected sound may be more accurate than if the sound had been detected by acoustic transducers 220(D) and 220(E).

Controller 225 of neckband 205 may process information generated by the sensors on 205 and/or augmented-reality system 200. For example, controller 225 may process information from the microphone array that describes sounds detected by the microphone array. For each detected sound, controller 225 may perform a direction-of-arrival (DOA) estimation to estimate a direction from which the detected sound arrived at the microphone array. As the microphone array detects sounds, controller 225 may populate an audio data set with the information. In embodiments in which augmented-reality system 200 includes an inertial measurement unit, controller 225 may compute all inertial and spatial calculations from the IMU located on eyewear device 202. A connector may convey information between augmented-reality system 200 and neckband 205 and between augmented-reality system 200 and controller 225. The information may be in the form of optical data, electrical data, wireless data, or any other transmittable data form. Moving the processing of information generated by augmented-reality system 200 to neckband 205 may reduce weight and heat in eyewear device 202, making it more comfortable to the user.

Power source 235 in neckband 205 may provide power to eyewear device 202 and/or to neckband 205. Power source 235 may include, without limitation, lithium ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 300 in FIG. 3, that mostly or completely covers a user's field of view. Virtual-reality system 300 may include a front rigid body 302 and a band 304 shaped to fit around a user's head. Virtual-reality system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 300 and/or virtual-reality system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 200 and/or virtual-reality system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 100, augmented-reality system 200, and/or virtual-reality system 300 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
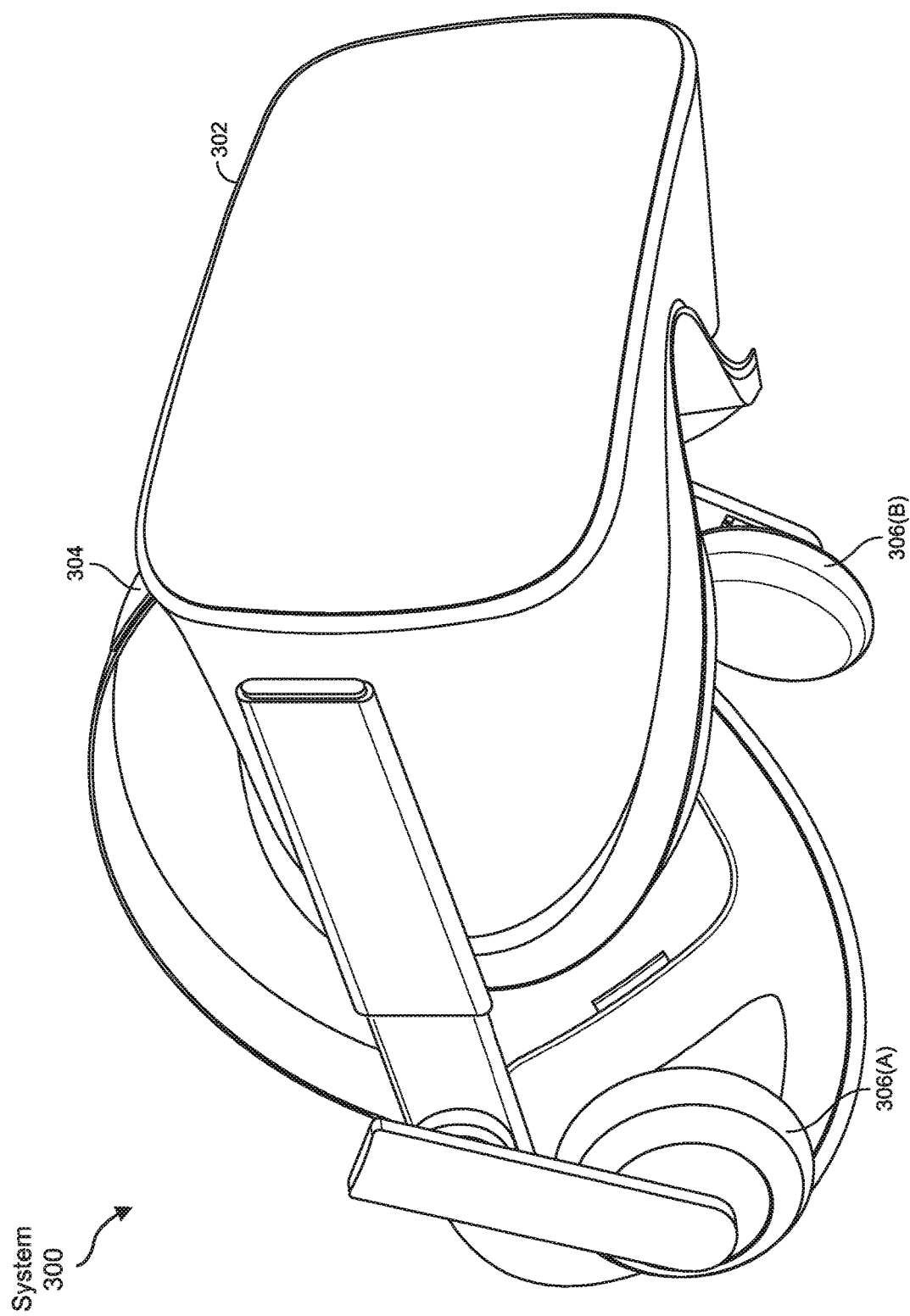
FIG. 3 illustrates an embodiment of a virtual reality headset.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Figure 4:
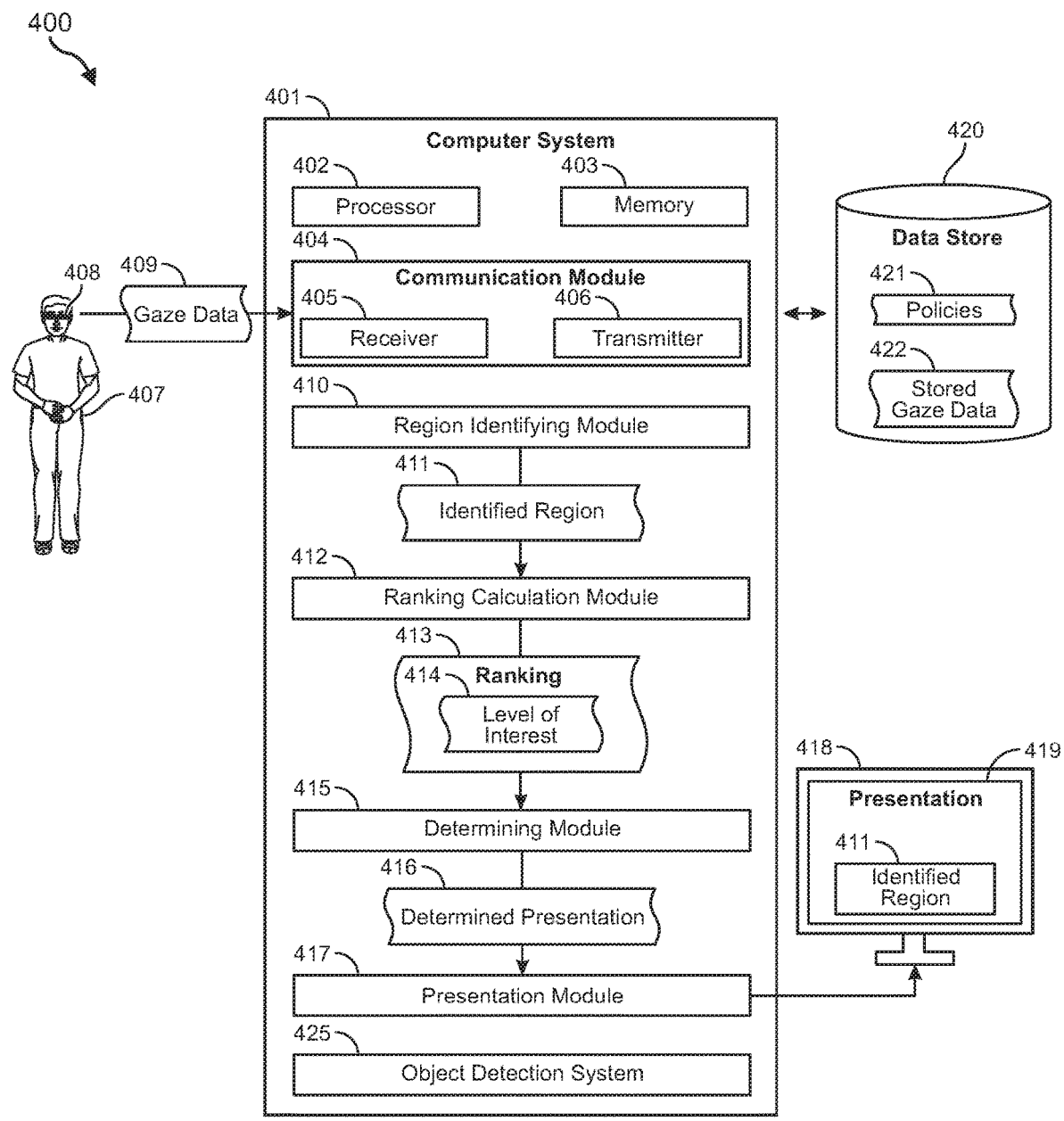
FIG. 4 illustrates an embodiment of a computing architecture in which at least some of the embodiments herein may operate.

FIG. 4 illustrates a computing architecture 400 in which many of the embodiments described herein may operate. The computing architecture 400 may include a computer system 401. The computer system 401 may include at least one processor 402 and at least some system memory 403. The computer system 401 may be any type of local, embedded, or distributed computer system, including a cloud computer system. The computer system 401 may include program modules for performing a variety of different functions. The program modules may be hardware-based, software-based, or may include a combination of hardware and software. Each program module may use or represent computing hardware and/or software to perform specified functions, including those described herein below.

For example, a communications module 404 may be configured to communicate with other computer systems. The communications module 404 may include any wired or wireless communication means that can receive and/or transmit data to or from other computer systems. These communication means may include radios including, for example, a hardware-based receiver 405, a hardware-based transmitter 406, or a combined hardware-based transceiver capable of both receiving and transmitting data. The radios may be WIFI radios, cellular radios, Bluetooth radios, global positioning system (GPS) radios, or other types of radios. The communications module 404 may be configured to interact with databases, mobile computing devices (such as mobile phones or tablets), embedded systems, or other types of computing devices.

The computer system 401 may also include a region identifying module 410. The region identifying module 410 may be configured (using, for example, an eye-tracking system) to identify an area or region 411 at which the user is currently gazing. The region identifying module 410 may also identify certain objects within the user's gaze such as persons, books, or other items. Additionally or alternatively, the region identifying module 410 may identify a specified region 411, which may be circular, square, rectangular or other area of space. This region 411 may be an area that is less than the entire area viewed by the user. For example, if a user is currently gazing at a wall with one or more pictures, the identified region may include one, two or more of these pictures. The region may also include the area around the pictures. Thus, the region 411 identified by the region identifying module 410 may be large or small and may include many objects or no objects. Regardless of what is in the identified region or how it is defined, the ranking calculation module 412 may access this identified region 411 and may calculate a ranking indicating the user's perceived level of interest in the region.

For example, if user 407 is looking at a general area within a room, the user's artificial reality device 408 may implement one or more external-facing cameras to stream or record what the user is looking at. Additionally or alternatively, the artificial reality device 408 may implement one or more internal-facing photodetectors designed to capture movement of the user's eyes. These internal-facing photodetectors may be coupled to a scanning light source. Other eye tracking methods may also be used. The resulting gaze data 409 may include the video data from the cameras indicating where the user is looking. Alternatively, the gaze data 409 may simply indicate where the user is looking and other cameras (perhaps positioned in the room or other venue) may provide video data of the objects or region at which the user is looking. Various computing hardware may be used to determine where the user is looking. For instance, an eye-tracking system may be built into the artificial reality device 408 (or built into any of the other artificial reality devices 100, 200, or 300 of FIG. 1, 2, or 3).

An eye-tracking system may include any suitable or applicable eye-tracking component, device, and/or monitoring system, which may operate in conjunction with an immersive technology item, such as a virtual reality headset and/or augmented reality band or goggle set. In general, the eye-tracking system may visually monitor, or otherwise monitor, at least one or both of the eyes of the user. For example, the eye-tracking system may be disposed within the artificial reality device 408 such that one or more cameras, or other sensors, are oriented toward one or both of the eyes of the user. Accordingly, the sensors may provide input into one or more circuits or computing components within the eye-tracking system. In some examples the sensors may provide a continuous stream of input, such as video input, into the circuits or computing components. Upon receiving the sensor data, these circuits or computing components may effectively analyze the incoming sensory data to process it and accordingly extract one or more items of data relating to an orientation of at least one eye of the user. For example, the circuits or computing components of the eye-tracking system may perform various analyses that model the actual eye of the user onto a three-dimensional or virtualized model.

Using this sensor data, the circuits or computing components of the eye-tracking system may attempt to identify sub-features of the overall exposed eyeball surface of the user. Accordingly, the circuits or computing components of the eye-tracking system may further attempt to identify any suitable permutation of one or more of the following sub-features: the site where the conjunctiva merges with the cornea, the palpebral fissure, the lateral commissure or canthus, the eyelid, the eyebrow, the eyelashes, the pupil, the lacrimal caruncle, the medial commissure or canthus, and the sclera. Similarly, the circuits or computing components of the eye-tracking system may further identify, for any one or more of the sub-features identified above, a two-dimensional or three-dimensional orientation of these features within the corresponding model. For example, in some cases the circuits or computing components may effectively identify a center or central portion of the pupil of the user and also further identify, estimate, or otherwise calculate a three-dimensional center of the user's eyeball. The circuits or components may then infer onto the corresponding model a two-dimensional line or vector thereby indicating an orientation of the user's eye.

Moreover, the circuits or computing components of the eye-tracking system may further analyze any suitable permutation of the sub-features identified above to further estimate the corresponding curve of the lens of the user's eyeball, which may further indicate a focal distance and/or a corresponding distance between the user's eyeball and an object on which the user is focusing his or her vision (i.e., "object-distance"). Similarly, the circuits or components may further analyze the orientation of both eyeballs to thereby calculate or estimate an intersection point between two lines of sight indicated by the eyeballs respectively, thereby further indicating the focal distance and/or object-distance. Using any one or more of the techniques identified above, the eye-tracking system may effectively identify a one-dimensional or two-dimensional vector corresponding to an orientation of one or more eyeballs of the user. Similarly, the eye-tracking system may also effectively identify an estimated focal distance and/or object-distance (e.g., a distance from the user's eyeball along the vector toward the object).

Additionally, the computer system 401 or the eye-tracking system may determine, not just a relative orientation of the user's eye with respect to a center of the user's eye, but also an absolute orientation of the user's eye after situating the user's eye within a larger three-dimensional model of the larger environment around the user (e.g., the virtualized, semi-virtualized, and/or real-world environment surrounding the user). Accordingly, the computer system 401 or the eye-tracking system may determine a vector and/or corresponding length from one or both eyeballs, as well as potentially identifying the intersection, within the larger three-dimensional model of the larger environment around the user. For example, the eye-tracking system may determine the relative orientation and/or object-distance based on locally tracking or monitoring the user's eyes, whereas computing device 401 or processors within the artificial reality device 408 may further translate one or more of these items of information into an absolute and/or three-dimensional vector and/or distance within the corresponding three-dimensional model of the environment around the user. The eye-tracking system may perform these additional steps regardless of whether the user is immersed within a completely virtual world using a virtual reality headset or a semi-virtualized world using an augmented reality system.

In addition to identifying one or more points of interest, the eye-tracking system may further identify one or more objects corresponding to this point of interest. For example, the eye-tracking system may interface with an artificial intelligence-based object detection system. In these examples, the object detection system may optionally disaggregate visual information associated with the user's field of view to detect separately identifiable objects within the user's field of view. Moreover, the eye-tracking system and/or the corresponding object detection system may also subsequently map the point of interest to at least a portion of one of the separately identifiable objects detected by the object detection system. The object detection system may be built into the artificial reality device 408 (or built into any of the other artificial reality devices 100, 200, or 300 of FIG. 1, 2, or 3), or may be part of the computer system 101 (e.g., module 425).

One or more of the systems described herein may identify, based at least in part on the orientation of the user's eye, a point of interest within a field of view of the user. For example, the computer system 401 may identify, based at least in part on the orientation of the user's eye, a point of interest within a field of view of the user. In some examples, the computer system 401 may effectively record information indicating the orientation of the user's eye within orientation data stored in data store 420. The computer system 401 may identify the point of interest within the field of view of the user in a variety of ways. In some examples, the term "point of interest" may refer to a set of at least one or more points in either (i) a specific two-dimensional plane or other surface (e.g., a specific point on a painting on which the user is gazing) and/or (ii) a three-dimensional space in which the user is present or three-dimensional-dimensional subspace on which the user is gazing. In the latter scenario, the set of points of interest may include a specific surface on which the user is gazing, such as a partial or total surface on a three-dimensional statue in a museum.

In general, the computer system 401 may identify the point of interest at least in part by mapping the point of interest along the orientation of the user's eye at the point where the user's eye has focused and/or at the point where the user's two respective lines of sight, corresponding to both of the user's eyes, thereby intersect. In some embodiments, the computer system 401 may identify the point of interest at least in part by receiving information indicating the point of interest from the eye-tracking system. In some examples, the computer system 401 may request one or more of these corresponding items of information from the eye-tracking system. Alternatively, in some examples, the computer system 401 may receive these items of information without first requesting them. For example, in some scenarios, the computer system 401 may receive one or more continuous streams of information indicating a point of interest on which the user is gazing. More specifically, in some examples, the eye-tracking system may continuously monitor the movement and/or other attributes of one or more of the user's eyes, and thereby provide a continuous stream of information (e.g., gaze data 409) indicating a series of points of interest on which the user gazes, as the user continues to move his or her eyes in real-time.

The ranking calculation module 412 may take this gaze data 409 and/or the identified region data 411 and calculate an eye ranking for one or more different areas. Each ranking 413 may indicate the user's level of interest 414 in the region. Thus, for example, if a user gazes at a particular region on a wall for an extended period of time, the ranking calculation module 412 may determine that the user has a relatively high level of interest in that area. Alternatively, if the user rarely gazes at a specific area, that area may receive no ranking or may receive a relatively low ranking, indicating that the user was not interested in that area. Other means of assessing interest in an object or area may include, but are not limited to, analyzing the user's blink rate, pupil dilation, saccades, persistence, or other features or actions related to the user's eye or to the user's behavior generally.

Using this ranking 413, the determining module 415 of computer system 401 may determine that the video data from the user's artificial reality device 408 (or from other cameras) is to be presented in a specified manner. For instance, this video data may be presented on a display (e.g., 418). This display may provide a live feed of what the user is looking at or may provide a delayed feed indicating what the user was previously looking at. In some cases, this video feed may be curated such that only interesting snippets are shown. Alternatively, the user's gaze data 409 may be presented in other forms including text summaries of what the user was viewing, still images of what the user was viewing, heat maps indicating where the user was looking, or other forms. Once the determining module 415 determines how the data is to be presented (e.g., in determined presentation 416), the presentation module 417 may generate a presentation 419 of the identified region 411 and may present the presentation 419 in display 418. Any or all of the decisions made throughout this process from identifying the region to calculating the ranking to determining the presentation, may be influenced by or determined according to policies 412 stored in data store 420. These embodiments will be described in greater detail below with regard to method 500 of FIG. 5.

Figure 5:
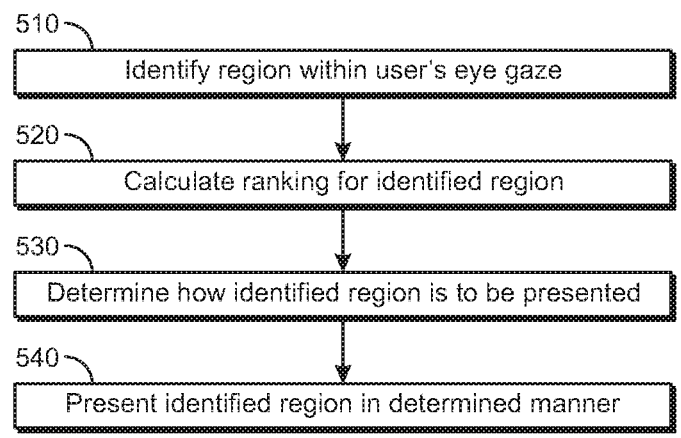
FIG. 5 illustrates a flow diagram of a method for presenting information according to a determined eye ranking.

FIG. 5 is a flow diagram of an exemplary computer-implemented method 500 for presenting information according to a determined eye ranking. The steps shown in FIG. 5 may be performed by any suitable computer-executable code and/or computing system, including the computer system 401 illustrated in FIG. 4. In one example, each of the steps shown in FIG. 5 may represent an algorithm whose structure includes and/or is represented by multiple substeps, examples of which will be provided in greater detail below.

As illustrated in FIG. 5, at step 510 one or more of the systems described herein may identify a region within a user's eye gaze. The systems described herein may perform step 510 in a variety of ways. In one example, the region identifying module 410 of computer system 401 may identify a region within a user's eye gaze. In the embodiments described herein, the user's eye gaze may refer to those areas or objects at which the user's eyes are directed. The user's eye gaze may coincide with the user's head gaze, which may refer to the direction the user's head is turned, or may be different than the user's head gaze. Thus, if the user's head is turned one direction and the user's eyes are facing a different direction, the user's eye gaze will follow the direction of the user's eyes.

Figure 6:
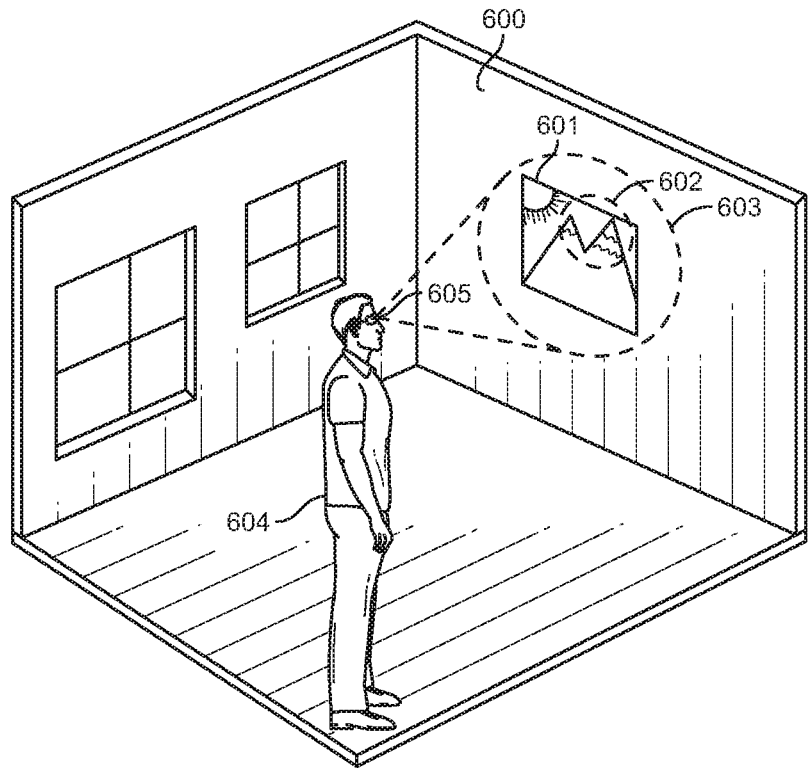
FIG. 6 illustrates an environment in which a user is gazing at a specified object using an artificial reality headset.

As illustrated in FIG. 6, a user's eyes may focus on a specific object such as an item on a wall including a painting, a television, a whiteboard, or some other item. In FIG. 6, for example, user 604 may be looking at painting 601 which may depict a landscape with mountains. The painting 604 may be hung on a wall within the user's environment 600. The user 604 may be wearing an artificial reality device 605 such as artificial reality glasses (e.g., 202 of FIG. 2, or any of the artificial reality devices 100, 200 or 300 of FIG. 1, 2, or 3, respectively). These artificial reality glasses 605 may include one or more external-facing cameras configured to capture what the user is looking at (i.e., items or areas within the user's gaze). In FIG. 6, the external cameras of the artificial reality glasses 605 may be capturing a specified region 603 of the user's environment. An eye-tracking system (including, e.g., cameras or other sensors) may be used to determine where, within the captured region 603, the user is looking (i.e., where the user's gaze has settled). This eye-tracking system may analyze the direction of the user's eyes and may thus determine that the user is looking specifically at a localized region 602 on the painting. The region identifying module 410 of FIG. 4 may be configured to identify relatively large regions (e.g., 603) at which the user is looking, and may also configured to identify smaller, more focused regions (e.g., 602).

The region identifying module 410 may also be configured to track the amount of time spent looking at each region (a metric sometimes known as "dwell time"). This information may be translated to a heat map showing the areas of an environment at which the user spent the most time looking. For instance, internal-facing cameras or photodetectors with a corresponding light source may be oriented toward the user's eyes. The internal-facing equipment may determine where the user is looking and how long the user looks in each direction. This gaze data may be stored and transferred to a heat map such as heat map 1000 of FIG. 10.

The region identifying module 410 may also be configured to identify specific items or objects at which the user is looking. At least in some embodiments, the region identifying module 410 may work with or access data from the object detection system 425. The object detection system 425 may be configured to identify objects such as persons, phones, electronic displays, books, magazines, maps, paintings, outdoor features such as trees, animals, mountains, etc. or other items. Thus, the region identifying module 410 and/or the object detection system 425 may not only determine the general region at which the user's gaze has settled but may also identify objects within that region, whether indoors or outdoors. The computer system 401 may implement various forms of machine learning or other automated image processing algorithms to identify the objects within the user's gaze data 409.

The method 500 may next include a step of calculating a ranking for the identified region within the user's eye gaze (step 520). The ranking may indicate the user's level of interest in the identified region. For example, after the region identifying module 410 identifies a general or specific region at which the user is looking, the ranking calculation module 412 may calculate a ranking 413 for that region 411. This eye ranking 413 may specify the user's level of interest 414 in that region based on the user's gaze. For instance, if the user looks at the region (e.g., region 602 of FIG. 2) for an extended period of time, the user may be more interested in that area. Or, if the user looks at multiple different areas but repeatedly returns to a specific region, that region (e.g., 603) may hold a higher level of interest for the user. Still further, the user's blink rate, pupil dilation or subtle eye movements (i.e., saccades) may also indicate a user's interest or disinterest in an object or area.

In some embodiments, the computer system 401 may implement supervised or unsupervised machine learning to teach itself which factors are most indicative of interest for each user. For instance, some users may have more control of their saccades and, in such cases, saccades may not necessarily indicate the user's level of interest or disinterest. Other users may have more control over their blink rate or the length of time they spend looking at an object. In some cases, a certain number of users may be tested to determine an average number of saccades or an average number of blinks within a timeframe. These average numbers may then be used by the machine learning models to determine a current user's level of interest in a specific object or region. Other user actions may also be monitored and recorded. This recorded data may then be used by the machine learning models to determine which parameters or factors are most indicative of interest for each user. As such, machine learning (or other forms of artificial intelligence) may be used to customize the determination of interest in a given object or region.

Based on the calculated level of interest 414, the determining module 415 may determine, at step 530, how the identified region is to be presented. The determining module 415 may look to the calculated ranking 413 and/or the indicated level of interest 414 to determine how the user's gaze data 409 is to be presented. For instance, the user's gaze data 409 may be presented on a display such as an artificial reality device, a computer monitor, television, tablet, laptop, smartphone, or other device that includes an electronic display. In some cases, for example, the user's gaze data 409 may be presented on display 418 in a presentation 416. The presentation module 417 may access the determined presentation 416 and present it in display 418 (step 540).

As the user (e.g., 604 of FIG. 6) continues to look around a room or other environment, the computer system 401 may identify different regions that may rank higher or lower than the others. As such, in some cases, the determined presentation 416 may be configured to show the highest ranked region (i.e., the region in which the user is determined to have the most interest). Other, lower ranked regions may also be shown in the display 418, perhaps in a different order or in smaller versions that only take up portion of the screen. In some cases, the determined presentation may include presenting different identified regions side by side in different video streams. In other cases, viewers of display 418 may be able to select which regions are shown based on the calculated ranking 413. Many different variations are possible on this theme, each of which may be controlled using policies 421. Many other operations may be performed on the gaze data 409 based on the calculated ranking 413. For example, as noted above, at least some portion of the region within the user's eye gaze may be captured electronically. This eye gaze data 409 may be streamed in a live manner or may be stored in a data store (e.g., 420) and streamed or otherwise communicated from the stored gaze data 422.

Figure 7:
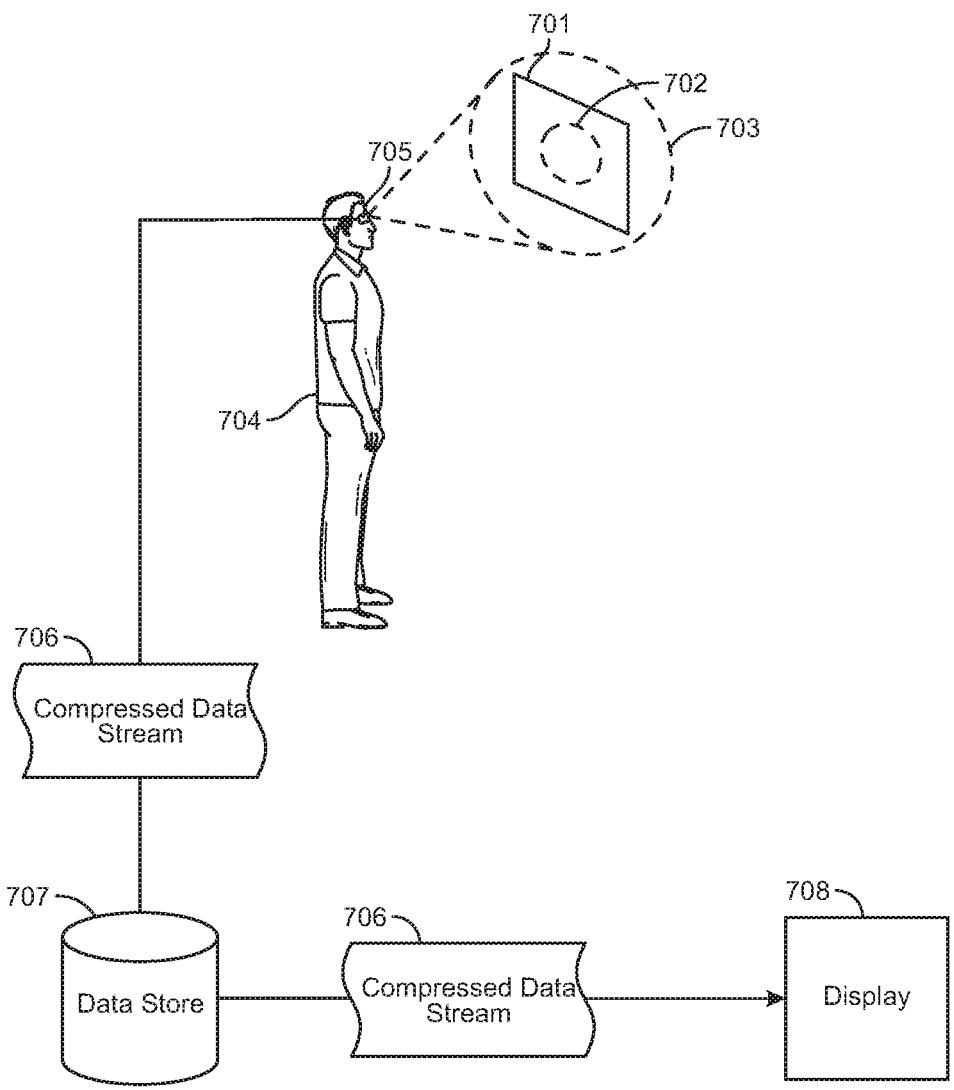
FIG. 7 illustrates an alternative environment in which a user is gazing at a specified object using an artificial reality headset.

In some embodiments, data associated with at least a portion of the electronically captured region may be compressed. As shown in FIG. 7, for example, a user 704 may be viewing an object 701 using an artificial reality device 705 such as augmented reality glasses. The artificial reality device 705 may include cameras that capture all or a portion of the objects or regions the user 704 looks at. In some cases, the region within the user's gaze may be divided into at least two sub-regions (e.g., 702 and 703). Each of these sub-regions may be compressed at a different compression level.

For example, data within the smaller sub-region 702 may be compressed at a lower rate, resulting in less compression and higher fidelity, while data within the larger sub-region 703 may be compressed at a higher rate, resulting in more compression and lower fidelity. Thus, in this manner, items or regions that the user is directly looking at and is interested in (e.g., sub-region 702) may be captured and presented with greater detail in higher fidelity. Other regions that are of lesser importance (e.g., regions that are ranked lower by the ranking calculation module 412 of FIG. 4) may be compressed at a higher rate since that data is presumably less important to the user 704. The compressed data stream 706, which may include compressed data for both sub-regions 702 and 703 (along with potentially other sub-regions), may be transmitted by the artificial reality device 705 to a data store 707 or directly to a display 708. Accordingly, the artificial reality device 705 may be configured to compress data representing the various sub-regions at which the user is looking and may be further configured to transmit the compressed data to various endpoints.

In cases where multiple sub-regions exist, each sub-region may be compressed in a different manner. In some embodiments, each sub-region may be compressed at a rate that corresponds to the assigned ranking. Thus, in such cases, higher-ranked regions may be compressed at lower rates and lower-ranked regions may be compressed at higher rates. The data for each sub-region may be combined into a single video stream and presented in the display 708. In this manner, the regions the user is most interested in may be presented in higher fidelity alongside the lower-ranked regions which may be presented alongside the high-ranked regions in the same video stream. The various regions may be blended seamlessly together in the video stream, such that one viewing the video stream may be drawn to the regions that are of interest to the artificial device-wearing user 704 as those regions will appear in higher detail relative to the other, lower detail regions in the video stream. In the embodiments herein, substantially any number of sub-regions may be designated and, as such, substantially any number of levels of compression may be used to compress the data from each sub-region.

Figure 8:
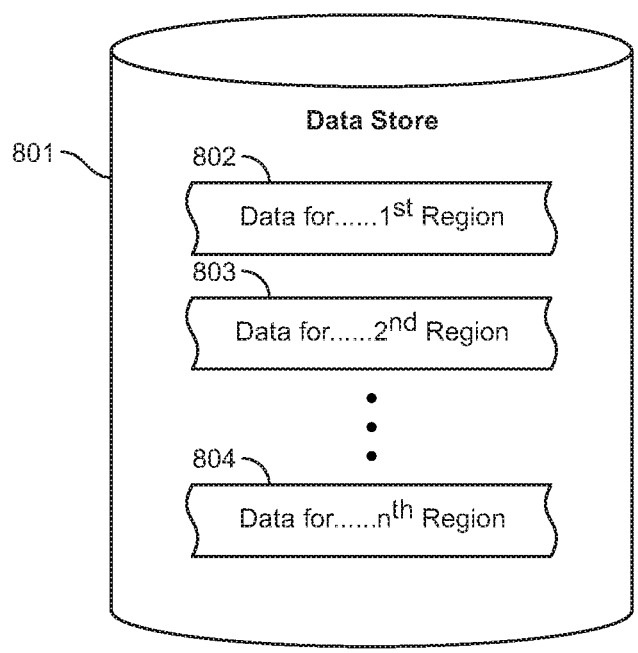
FIG. 8 illustrates an embodiment of a data store in which data from different eye gaze regions is stored in a different manner.

In addition to compressing some or all of the eye gaze data 409, some or all of the data associated with at least a portion of the identified region 411 may be stored electronically. As noted above, this data may be stored in data store 420 of FIG. 4. FIG. 8 also illustrates an embodiment of a data store 801, which may be the same as or different than data store 420. The data store 801 may be configured to store data for different identified regions (e.g., region 411 of FIG. 4 or regions 702 or 703 of FIG. 6) In FIG. 7, for example, the region within the user's gaze may be divided into at least two sub-regions. Electronically stored data associated with these regions may be stored separately and, in some cases, may be stored in different ways. As shown in FIG. 8, for example, data 802 for a first region (e.g., data from region 702 of FIG. 7) may be stored separately from data 803 for a second region (e.g., region 703 of FIG. 7). Data for other regions 804 may also be stored separately from data of other regions.

Additionally or alternatively, the data associated with each sub-region may be stored at a different hierarchical level in the data store 801. For example, data 802 for the first region may be stored at a higher hierarchical level in the data store than data 803 or data 804. As noted with regard to FIG. 7, the region 702 and corresponding data 802 may be of greater interest to the user 704 and, thus, may be stored at higher fidelity. Still further, the data 802 may be stored in a higher level hierarchically which may be quicker to access. On the other hand, the region 703 and corresponding data 803 may be of less interest to the user and, as such, may be stored at a reduced fidelity. The data 803 may be stored in a lower level hierarchically which may be relatively slower to access. In some cases, for example, data 802 for the first region may be stored on data store hardware that is physically closer to the computer system 401, while data 803 or 804 may be stored on data store hardware devices that are physically further away from the computer system 401. In this manner, data storage for the various identified regions of interest (e.g., 411) may vary in the way it is stored and may further vary in the amount that is stored (e.g., due to compression) for each region.

Accordingly, as a user looks around a room, the data recorded from the user's viewpoint may be compressed and/or stored according to the relative level of interest or importance assigned by the rank calculation module 412 of computer system 401. Based on the user's eye movements, pupil dilation, blink rate, saccades, time spent on each object or region, etc., the systems described herein may determine a rank for that region or object and then determine how to compress and/or store the data associated with those regions. Based on this ranking, the systems described herein may also determine how to present the stored (or streamed) data to one or more users, whether on televisions, phones, tablets, or other electronic devices.

In one example, the user's eye gaze data 409 may, for example, be streamed to other users in a video conference or in a person-to-person video chat. In other cases, the user's data may be stored and presented as a streamable or downloadable video at a later time. For example, the user 407 of FIG. 4 may be an outdoor enthusiast hiking the Appalachian Trail. The user's gaze data 409 may be compressed, stored, and presented according to the calculated ranking 413. Accordingly, the user's gaze data may be stored in a manner similar to how a human brain stores information, and then recreated in a manner similar to how a brain formulates a mental image. That is, those areas on which the user focused the most may be compressed at the highest fidelity, stored in the most easily recalled manner, and presented according to what was of the most interest to the user.

In addition, a corresponding system for presenting information according to a determined ranking may include several modules stored in memory, including a region identifying module configured to identify a region within a user's eye gaze. The system may also include a ranking calculation module configured to calculate a ranking for the identified region within the user's eye gaze. The ranking may indicate the user's level of interest in the identified region. The system may also include a determining module configured to determine how the identified region is to be presented according to the calculated ranking. The system may further include a presentation module configured to present the identified region in the determined manner according to the calculated ranking.

In some embodiments, the system (e.g., computer system 401 of FIG. 4) may be configured to identify objects within the user's identified eye gaze region. For example, as noted above, machine learning or other image analysis algorithms may be implemented by computer system 401 to identify objects within the user's gaze. The processor 402 of computer system 101 may be configured to determine when the user's gaze has settled on an object. This determination may be made based on the amount of time spent looking at the object, based on blink rate, pupil dilation, saccades, etc. Once the processor 402 has determined that the user's gaze has settled on a specified object, the processor may further determine that the object upon which the user's gaze has settled includes one or more printed words. For instance, the user's gaze may settle upon a book, a magazine, a sign, a website, an electronic display showing text, or any other form of printed text (either physical ink print or electronic print).

Once the processor 402 has determined that the user's gaze has settled on a book, for example, the processor (or one of its modules) may begin to analyze the text. The processor 402 may implement text recognition or other software algorithms to identify the text printed on the object. The processor 402 may also note how long the user looks at each page, each paragraph, each sentence and/or each word. In cases where a user spends a relatively long amount of time on a given portion of text, the processor may make a note of those sections, storing an indication of how long the user spent looking at that portion of text and potentially also storing the text itself. The processor 402 (or one of its modules) may further be configured to generate and present those printed words in a highlighted, summarized form.

For example, if a user was reading a book or magazine, the processor 402 may track which pages the user spent the most time on, or which pages the user referred back to most often. The processor 402 may identify the text in these sections and then store the associated text. Furthermore, the processor 402 may note how long the user spent looking at each section. Then, the processor 402 may create a summarized version of the book, magazine, website, or other form of printed information. This summarized version may include highlighted portions that are bolded, italicized, colored (e.g., as if with a highlighter pen), or otherwise emphasized. The summarized version may thus include snippets of the book or other item, reflecting those portions the user was most interested in (or potentially the most confused by).

Figure 9A:
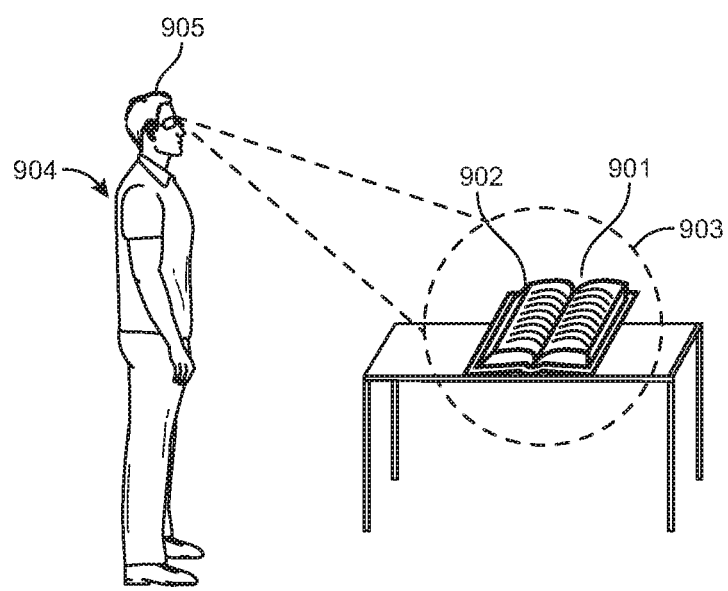
FIGS. 9A and 9B illustrate embodiments of a user wearing an artificial reality headset viewing an object that has one or more printed words.
Figure 9B:
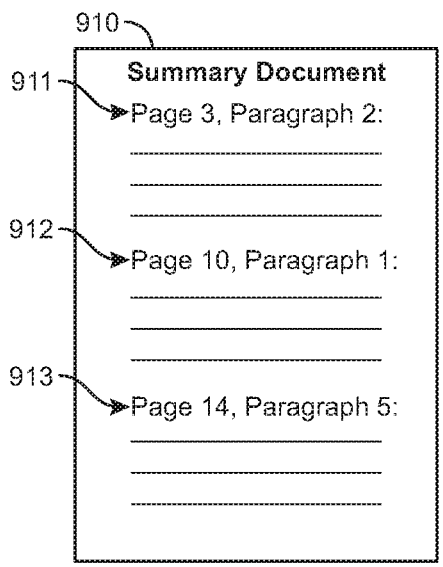

FIGS. 9A and 9B illustrate an example of a user 904 reading a book 901 while wearing an artificial reality device 905. The artificial reality device 905 may include one or more cameras or other sensors designed to determine where the user is looking and then capture those regions, areas, or objects. In FIG. 9A, the user may be reading a book 901, and the artificial reality device (or a computer communicatively connected thereto) may identify a region around the book generally (e.g., region 903). The artificial reality device 905 may also identify a smaller sub-region 902 indicating the paragraphs or lines of text at which the user 904 is directly looking. This gaze data may be stored, for example, in data store 801 of FIG. 8.

As noted above, the processor 402 may be configured to generate a summary document such as document 910 of FIG. 9B. Summary document 910 may include various paragraphs from the book such as, for example, paragraph 2 on page 3 (911), paragraph 1 from page 10 (912), paragraph 5 from page 14 (913), or other paragraphs. As noted above, the text presented in the summary document 910 may be highlighted in some form, especially for those pages, paragraphs, sentences, words, or phrases at which the user 904 spent the most time looking. The summary document 910 may also include images, gifs, videos, or other content that was captured while the user was looking at the object, such as when the user is looking at a website or an electronic display screen.

The data associated with the book 901 or with any other identified objects may be compressed and/or stored in a manner that is specific to that object. Indeed, as noted, the user's artificial reality device 905 may identify a larger, more general region 903 and may also identify a smaller, more localized region 902. The more general region 903 may be compressed at a higher rate (and thus at lower fidelity), while the more localized region 902 may be compressed at a lower rate (and thus at a higher fidelity). The data associated with these two areas (or more areas if applicable) may also be stored in different manners. The data associated with the larger, more general region 903 may be stored in a lower tier hierarchically. This may mean that the physical storage devices are slower or are physically located at a farther distance if stored on the cloud, for instance. On the other hand, the data associated with the smaller, more localized region 902 may be stored in a higher storage tier hierarchically, which may mean that the physical storage devices are faster (e.g., solid state drives (SSDs) as opposed to hard disks) or are physically located at a closer distance if stored in a distributed storage network. Thus, those areas that were of greatest focus and importance to the user may be stored with higher fidelity and on a higher storage tier. Other areas that were of lesser focus and lesser importance may be stored with lower fidelity and on a lower data storage tier.

In a similar manner, data may be stored, compressed, and/or presented differently depending on the level of expertise of the intended audience or based on the expertise of the user 904 wearing the artificial reality device 905. For example, certain data may be presented more or less prominently depending on the user's known familiarity with a subject. For example, certain generalized information associated with a book or painting may be stored at a lower tier and/or compressed at a higher rate, while specialized information associated with that book or painting (or other object) may be stored at a higher tier and/or compressed at a lower rate. Moreover, the calculated ranking 413 for the specific information may be higher, thus raising the likelihood that that information will be presented in the summary document 910 or in presentation 416. Still further, depending on the determined level of importance to the user 904, and depending on the audience to which the user's gaze data is to be presented, certain information may be left out (i.e., compressed at a higher rate or stored in a lower tier) if it is already well known to the audience.

In another embodiment, the computer system 401 may recognize that a user 407 is looking at an something of interest (e.g., text, an object, a face, etc.). The computer system 401 may then determine that the user has had some sort of reaction to that item. This may be determined based on the persistence of the user's gaze, pupil dilation, blink rate, saccades, etc. or may be based on other information detected by an electronic device such as heart rate detected by a smart watch. The user's reaction may provide a further indication of how the resulting gaze data 409 should be compressed, stored, and/or presented. Items or areas that the user looked at longer or more intently may be stored more prominently, may come up quicker in a data search, and may be ranked higher overall than other items or areas in which the user was not interested. The gaze data 409 associated with that object may then be compressed, stored, and/or presented based on the user's gaze and the determined eye ranking 413. The computer system 401 may also generate a shortened, summarized version of the gaze data. This summarized version may be automatically curated over time to include highlights of those items, areas, or regions in which the user was most interested. In some cases, this summary may come to represent a story of those things that were of most interest to the user.

In many of the embodiments described herein, the user's gaze data 409 which includes video information may also include audio information captured by one or more speakers on the artificial reality device 408. In embodiments where the user's gaze data 409 does not include audio, that audio data may be captured separately. In some cases, for example, the audio data may record words spoken by the user 407. The audio data may also include words spoken to the user by other people, or sounds from the environment around the user. This audio data may also be compressed, stored, and/or presented according to the calculated ranking 413. In some embodiments, machine learning algorithms may be applied to the audio data to identify the words spoken by the user 407. These identified words may be matched against other words from known literary works or from the books read by the user (e.g., book 901 of FIG. 9). In cases where the user speaks words that are similar to words or phrases found in the book, the computer system 401 may link the book and the user's words together. That book may then take on a higher level of importance, as it was quoted or referenced by the user. Furthermore, because the book was quoted or referenced by the user, the book may be re-ranked at a higher level and thus may be moved up in storage tier level and may be re-encoded at a higher level of fidelity.

As noted above, the processor 402 may be configured to determine that the user has reacted to the object or area upon which the user's gaze has settled. In some cases, the processor 402 may be further configured to identify the user's reaction and perform various specified actions based on the user's identified reaction. For example, if the user views an object such as another person's face and has some type of reaction (e.g., pupils dilate, blink rate changes, heart rate changes, etc.), then the processor 402 may begin to automatically focus on that person's face, applying little or no compression to data related with the person's face and storing that data in a top tier data store. Moreover, the processor 402 may begin presenting information related to that person's face in display 418. The information may include a video and/or audio feed of the person's face, along with potentially other information about the user. Various reactions and associated actions may be stored with other policies 421 in data store 420. When determining where the user is looking when identifying an object, the processor 402 may look not only at the user's current eye gaze, but also the user's head gaze. The direction of the user's head may provide additional information indicating interest that may be used when calculating the ranking for the identified object or region.

Figure 10:
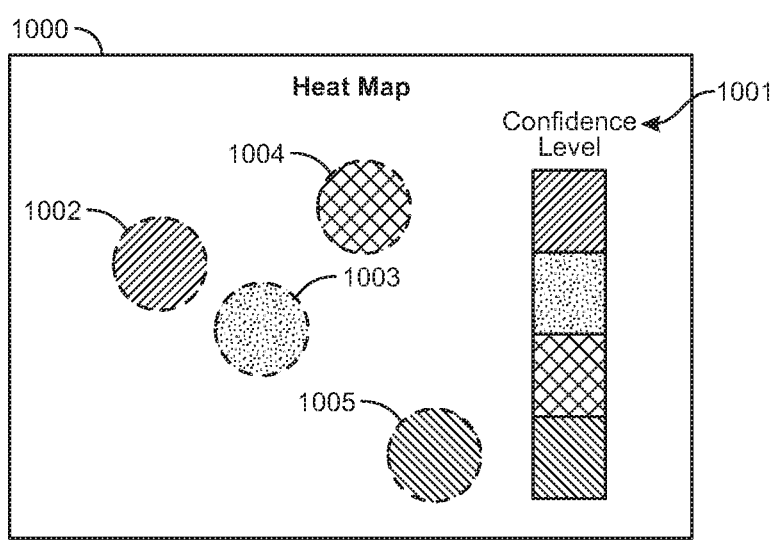
FIG. 10 illustrates an embodiment of a heat map indicating where a user's gaze has been within a specified area.

FIG. 10 illustrates an embodiment of a heat map 1000. In at least some embodiments, the processor 402 may be configured to generate a heat map 1000 indicating locations where the user's eyes have gazed within a specified time window. For example, in heat map 1000, the user may have spent a majority of time looking at area 1002. As noted in the confidence level 1001, the area 1002 is a high confidence level, indicating that the processor 402 is highly confident that the user is interested in that area. The confidence level 1001 for areas 1003 and 1004 is somewhat lower, while confidence is lowest for area 1005. In this manner, the heat map 1000 may provide a level of confidence for the calculated ranking associated with each separate area. Heat maps may be generated for substantially any area, region, or object, including indoor or outdoor areas and objects. The illustrated textures may be applied in a standalone heat map, or may be projected onto or overlaid onto an existing environment so that the viewing user can see the objects or areas along with heat map indicators.

Accordingly, in this manner, a computer system may receive and process information based on where a user is looking and how interested the user is in that region. The systems herein may analyze a user's behaviors and determine, based on what areas, objects, or regions the user is looking at, how interested the user is in those items. Then, based on the user's calculated level of interest, the systems herein may compress, store, and present data associated with the user's gaze in different manners according to the calculated eye ranking and associated level of interest. As such, data may not merely be captured, stored and presented in the traditional manner, but may be stored, compressed, and presented in a variety of different ways and at a variety of different levels according to the user's determined level of interest.

As described above, the instant disclosure describes methods and systems for detecting a user's eye gaze and processing and presenting data based on that detected gaze. In one example, a computer-implemented method for presenting information according to a determined eye ranking may include identifying a region within a user's eye gaze and calculating a ranking for the identified region within the user's eye gaze. The ranking may indicate the user's level of interest in the identified region. The method may next include determining how the identified region is to be presented according to the calculated ranking and then presenting the identified region in the determined manner according to the calculated ranking.

In some examples, at least a portion of the region within the user's eye gaze is captured electronically. In some examples, data associated with at least a portion of the electronically captured region may be compressed. In some examples, the region within the user's gaze may be divided into at least two sub-regions, where each sub-region is compressed at a different compression level. In some examples, presenting the identified region in the determined manner may include presenting the compressed data for each sub-region in an electronic display.

In some examples, data associated with at least a portion of the electronically captured region may be stored in a data store. In some examples, the region within the user's gaze may be divided into at least two sub-regions. In some examples, the data associated with each sub-region may be stored at a different hierarchical level in the data store. In some examples, the method may further include identifying an object within the user's identified eye gaze region. In some examples, data associated with the identified object may be compressed and/or stored in a specified manner. In some examples, data associated with a specified region around the identified object may be compressed and/or stored in a different specified manner.

In addition, a corresponding system for presenting information according to a determined ranking may include several modules stored in memory, including a region identifying module configured to identify a region within a user's eye gaze. The system may also include a ranking calculation module configured to calculate a ranking for the identified region within the user's eye gaze. The ranking may indicate the user's level of interest in the identified region. The system may also include a determining module configured to determine how the identified region is to be presented according to the calculated ranking. The system may further include a presentation module configured to present the identified region in the determined manner according to the calculated ranking.

In some examples, the system may include a processor that is configured to determine when the user's gaze has settled on an object. The processor may be further configured to determine when the object upon which the user's gaze has settled includes one or more printed words. In some examples, the processor may be configured to present the printed words in a highlighted, summarized form.

In some examples, the processor may be further configured to determine that the user has reacted to the object upon which the user's gaze has settled. In some examples, the processor may be further configured to identify the user's reaction and perform various specified actions based on the user's identified reaction. In some examples, the processor may be further configured to analyze the user's current head gaze in addition to the user's eye gaze when calculating the ranking for the identified region.

In some examples, the processor may be further configured to generate a heat map indicating locations where the user's eyes have gazed within a specified time window. In such cases, the heat map may provide a level of confidence for the calculated ranking.

In some examples, the above-described method may be encoded as computer-readable instructions on a computer-readable medium. For example, a computer-readable medium may include one or more computer-executable instructions that, when executed by at least one processor of a computing device, may cause the computing device to identify a region within a user's eye gaze and calculate a ranking for the identified region within the user's eye gaze. The ranking may indicate the user's level of interest in the identified region. The computing device may further determine how the identified region is to be presented according to the calculated ranking and then present the identified region in the determined manner according to the calculated ranking.

Features from any of the embodiments described herein may be used in combination with one another in accordance with the general principles described herein. These and other embodiments, features, and advantages will be more fully understood upon reading the following detailed description in conjunction with the accompanying drawings and claims.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive gaze data to be transformed, transform the gaze data, output a result of the transformation to identify a region associated with the user's gaze, use the result of the transformation to determine how to present the identified region, and store the result of the transformation to present the identified region. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A computer-implemented method comprising:
   identifying a region within a user's eye gaze including disaggregating visual information associated with the user's eye gaze to detect one or more separately identifiable physical objects within the user's field of view;
   calculating a ranking for the identified region within the user's eye gaze, the ranking indicating the user's level of interest in the identified region, wherein the ranking is determined based on one or more factors that are determined to be most indicative of interest for that specific user;
   determining how the identified region is to be presented according to the calculated ranking; and
   presenting the identified region in the determined manner according to the calculated ranking.

2. The computer-implemented method of claim 1, wherein at least a portion of the region within the user's eye gaze is captured electronically.

3. The computer-implemented method of claim 2, wherein data associated with at least a portion of the electronically captured region is compressed.

4. The computer-implemented method of claim 3, wherein the region within the user's gaze is divided into at least two sub-regions, each sub-region being compressed at a different compression level.

5. The computer-implemented method of claim 4, wherein presenting the identified region in the determined manner includes presenting the compressed data for each sub-region in an electronic display.

6. The computer-implemented method of claim 2, wherein data associated with at least a portion of the electronically captured region is stored in a data store.

7. The computer-implemented method of claim 3, wherein the region within the user's gaze is divided into at least two sub-regions, and wherein the data associated with each sub-region is stored at a different hierarchical level in the data store.

8. The computer-implemented method of claim 1, further comprising identifying an object within the user's identified eye gaze region.

9. The computer-implemented method of claim 8, wherein data associated with the identified object is compressed and/or stored in a specified manner.

10. The computer-implemented method of claim 9, wherein data associated with a specified region around the identified object is compressed and/or stored in a different specified manner.

11. A system comprising:
at least one physical processor;
physical memory comprising computer-executable instructions that, when executed by the physical processor, cause the physical processor to:
  identify a region within a user's eye gaze including disaggregating visual information associated with the user's eye gaze to detect one or more separately identifiable physical objects within the user's field of view;
  calculate a ranking for the identified region within the user's eye gaze, the ranking indicating the user's level of interest in the identified region, wherein the ranking is determined based on one or more factors that are determined to be most indicative of interest for that specific user;
  determine how the identified region is to be presented according to the calculated ranking; and
  present the identified region in the determined manner according to the calculated ranking.

12. The system of claim 11, wherein the processor is further configured to determine when the user's gaze has settled on an object.

13. The system of claim 12, wherein the processor is configured to determine when the object upon which the user's gaze has settled includes one or more printed words.

14. The system of claim 13, wherein the processor is configured to present the printed words in a highlighted, summarized form.

15. The system of claim 11, wherein the processor is further configured to determine that the user has reacted to the object upon which the user's gaze has settled.

16. The system of claim 15, wherein the processor is further configured to identify the user's reaction and perform one or more specified actions based on the user's identified reaction.

17. The system of claim 11, wherein the processor is further configured to analyze the user's current head gaze in addition to the user's eye gaze when calculating the ranking for the identified region.

18. The system of claim 11, wherein the processor is further configured to generate a heat map indicating locations where the user's eyes have gazed within a specified time window.

19. The system of claim 18, wherein the heat map provides a level of confidence for the calculated ranking.

20. A non-transitory computer-readable medium comprising one or more computer-executable instructions that, when executed by at least one processor of a computing device, cause the computing device to:
  identify a region within a user's eye gaze including disaggregating visual information associated with the user's eye gaze to detect one or more separately identifiable physical objects within the user's field of view;
  calculate a ranking for the identified region within the user's eye gaze, the ranking indicating the user's level of interest in the identified region, wherein the ranking is determined based on one or more factors that are determined to be most indicative of interest for that specific user;
  determine how the identified region is to be presented according to the calculated ranking; and
  present the identified region in the determined manner according to the calculated ranking.

* * * * *